UNITED STATES PATENT OFFICE.

THOMAS PRINGLE MILLIGAN, OF ELIZABETH, NEW JERSEY.

SIZING COMPOSITION.

SPECIFICATION forming part of Letters Patent No. 653,776, dated July 17, 1900.

Application filed December 3, 1898. Serial No. 698,212. (No specimens.)

*To all whom it may concern:*

Be it known that I, THOMAS PRINGLE MILLIGAN, a citizen of the United States, and a resident of Elizabeth, in the county of Union and State of New Jersey, have invented or discovered a new and useful improvement in compositions for making sizing to be used in the manufacture of paper and for other purposes, of which the following is a specification.

In the preparation of sizing for use in making paper resin has held its own as the chief ingredient; but to effect a solution of resin it is necessary that it be acted upon by an alkaline substance, and soda-ash has usually been used for such purpose. The method heretofore and now most generally pursued is that of forming a resinate of soda by taking resin and soda-ash in about the proportions of four to one and placing them in bulk into a kettle or vat, in which they are boiled some ten or twelve hours or until a thick pudding-like mass is formed. This mass is allowed to stand until the excess of alkali rises to the top, as it usually does in the form of a dark reddish fluid, which is removed, and the remainder or resinate of soda is diluted with water and passed through a fine sieve to remove the fine grit and dirt. The diluted solution thus prepared is used in the beating-engine of a paper-mill, where it is thoroughly mixed with the pulp. A solution of alum is added, the acid of which neutralizes the alkali of the soda, freeing the resin and causing it to return to a solid in the form of a fine precipitate, which adheres tenaciously to the fiber of the paper made from the pulp with which it is thus incorporated. The quantity of this sizing that can be used to advantage by a paper-maker is limited, and great skill is required to adjust the quantity to the quality of the pulp to be sized. If too much of the solution is used, the pulp will froth in the beating-engine and on the machine where the paper is felted, occasioning great trouble and sometimes a heavy loss.

My improvement has for its object the production of a composition which can be readily dissolved in almost any quantity of boiling water and a sizing produced within a shorter time than has heretofore been possible.

The improvement consists in the composition of matter, as hereinafter more fully described, and pointed out or indicated in the claim.

To attain the object in view, I form a dry composition which comprises among its ingredients powdered resin, soda-ash or an equivalent alkali, and starch or an equivalent starchy substance—as, for example, flour—the ingredients being thoroughly mixed and combined together in a dry state. As the proportions which may be used of the resin and of the alkaline and starchy substances may be varied, I state what I regard as the best proportions for ordinary purposes—to wit, four pounds of starch or equivalent substance to one of soda-ash or an alkaline substance of equal strength and four of resin. Each of the ingredients is reduced to a comminuted or powdered state and the whole thoroughly mixed together to bring the particles into intimate contact.

The preferable process of producing the solution or sizing from the composition consists in dredging or spreading the same upon the surface of hot or boiling water, on the surface of which it will float for the short space of time needed for melting the resin, which requires a temperature of about 176° Fahrenheit. The close contact of the substances and the buoyancy which they possess keep them together on the surface until the resin is fused or melted and then dissolved, which is almost instantly and occurs without sinking or precipitation. In the chemical action which takes place carbonic-acid gas is or seems to be formed and produces foaming; but the gas escapes into the air without causing an overflow even if the kettle be boiling. As soon as dissolution takes place of the quantity dredged or spread upon the surface of the water a second quantity of the composition is added to the water in the same way, and this operation is repeated as often as dissolution takes place and until such time as a sufficiently-heavy solution is formed, which requires but a short time. The starch as an ingredient of the composition seems to act as a medium of suspension at the time of dissolution, and when the alum or acid is used in the beating-engine to neutralize the alkali a precipitation takes place not only of the resin, but also of the starchy substance which becomes a part and parcel of the paper made from the pulp with which this sizing is incorporated in the usual manner. By using the starch the weight of the paper may be increased and the quality improved beyond that of a paper produced by the use of a sizing in which the resin alone or with the substances heretofore used adheres to the fiber. Moreover, the composition being uniform the exact strength can always be obtained and a clear transparent size produced of almost any desired weight, strength, or consistency. There is also a great saving in time, labor, and fuel needed in order to produce the sizing.

Of course any equivalent alkaline substance may be used instead of soda-ash and any equivalent starchy substance instead of starch, and there may or may not be other additions of substances such as clay or those usually incorporated into or forming part of the sizing required for the manufacture of paper, oil-cloth, waterproof sheeting, &c.

The solution of resin, soda-ash or other alkali, and starch or its equivalent forms a cheap glue more readily prepared than animal glue and quite as useful for many purposes. It also forms an excellent starch for use in stiffening or renovating many textile fabrics made into wearing-apparel.

Having thus described my invention, what I claim as new, and desire to secure by Letters Patent, is—

A composition of matter comprising as ingredients thereof, powdered resin, soda-ash or equivalent alkali, and starch or an equivalent substance, mixed and combined together in a dry state, substantially as described.

THOMAS PRINGLE MILLIGAN.

Witnesses:
A. OLDRIN SALTER,
M. H. SMALL.